US012744862B2

(12) United States Patent
Kida

(10) Patent No.: US 12,744,862 B2
(45) Date of Patent: Sep. 22, 2026

(54) DISPLAY METHOD, INFORMATION PROCESSING DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventor: Kensuke Kida, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/033,988

(22) Filed: Jan. 22, 2025

(65) Prior Publication Data

US 2025/0240384 A1 Jul. 24, 2025

(30) Foreign Application Priority Data

Jan. 22, 2024 (JP) ................................ 2024-007271

(51) Int. Cl.
*H04N 5/74* (2006.01)
*G06F 3/0486* (2013.01)
(Continued)

(52) U.S. Cl.
CPC ............ *H04N 5/74* (2013.01); *G06F 3/0486* (2013.01); *G06T 5/50* (2013.01); *H04N 9/31* (2013.01); *G06T 2207/20221* (2013.01)

(58) Field of Classification Search
CPC ...... H04N 9/3185; H04N 9/3194; H04N 5/74; H04N 9/317; H04N 9/31; H04N 9/3188; H04N 9/3179; G03B 21/14; G03B 21/147; G06T 5/50; G06T 2207/20221; G06F 3/0486
(Continued)

(56) References Cited

U.S. PATENT DOCUMENTS 10,989,993 B2 * 4/2021 Kurota ................ H04N 9/3194
2006/0038814 A1 2/2006 Rivera
(Continued)

FOREIGN PATENT DOCUMENTS

JP 2010-066327 A 3/2010
JP 2015-184383 A 10/2015
JP 2019-125955 A 7/2019

OTHER PUBLICATIONS

Epson, "Epson Projector Professional Tool Operation Guide", 2021, entirety available at: chrome-extension://efaidnbmnnnibpcajpcglclefindmkaj/https://files.support.epson.com/docid/cpd6/cpd61352.pdf, provided to POA on Dec. 26, 2024, pp. 53.

*Primary Examiner* — Sherrie Hsia

(74) *Attorney, Agent, or Firm* — Dority & Manning, P.A.

(57) ABSTRACT

There is provided a display method including projecting a first image including a first figure from a projection device, displaying, with an information processing device, a second image including a second figure corresponding to the first figure on a display device different from the projection device, when moving operation of moving the position of the first figure is received by the information processing device, causing the information processing device to display, on the second image, in correlation with the second figure, a movement indicator indicating that the first figure is moved in the first image, and projecting the first figure after the movement from the projection device.

14 Claims, 14 Drawing Sheets

(51) Int. Cl.
*G06T 5/50* (2006.01)
*H04N 9/31* (2006.01)

(58) Field of Classification Search
USPC ........ 348/739, 744–747, 806, 807; 345/698; 353/30, 69
See application file for complete search history.

(56) References Cited

U.S. PATENT DOCUMENTS

2015/0268537 A1 9/2015 Kinebuchi et al.
2019/0219907 A1 7/2019 Kurota et al.
2024/0257787 A1* 8/2024 Kubota ................ H04N 9/3194

* cited by examiner

FIG. 7

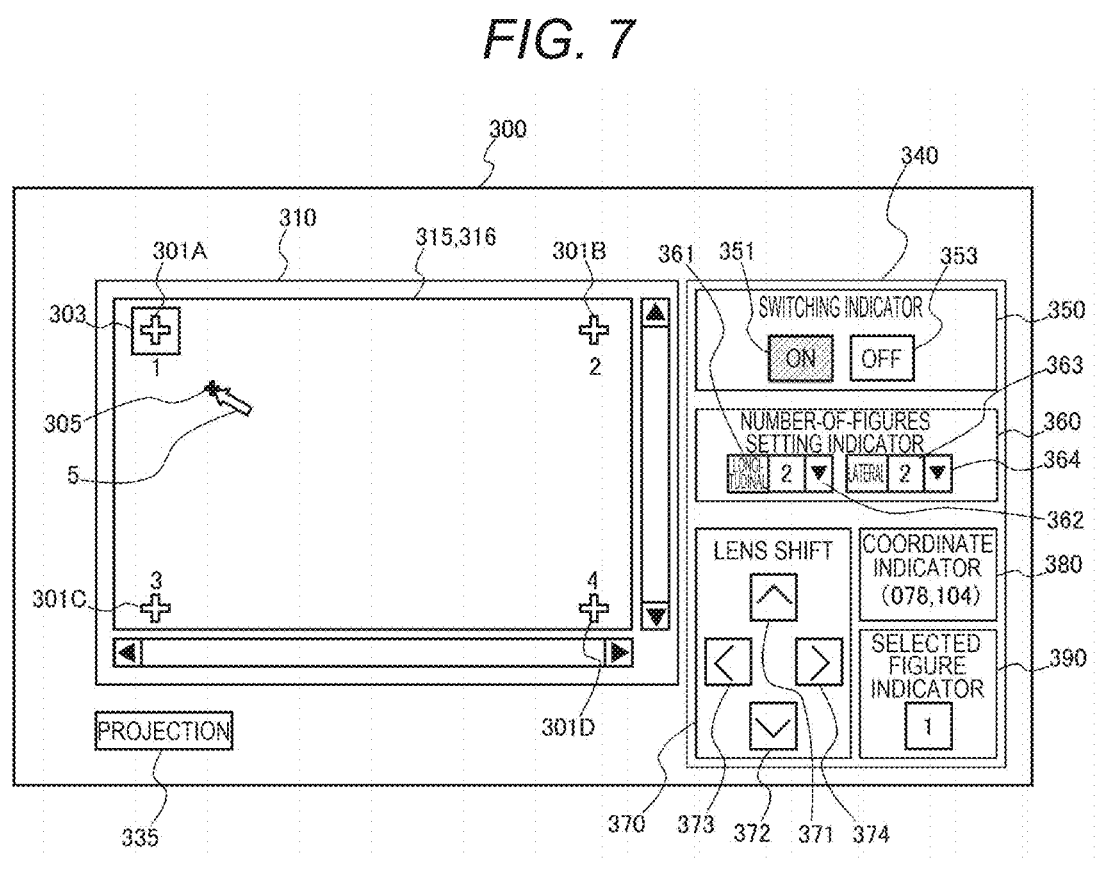

300
340
310
315,316
301A
301B
361
351
353
303
SWITCHING INDICATOR
ON
OFF
350
1
2
363
305
NUMBER-OF-FIGURES
SETTING INDICATOR
360
5
2
2
364
362
LENS SHIFT
COORDINATE
INDICATOR
(078,104)
380
3
4
301C
SELECTED
FIGURE
INDICATOR
1
390
301D
PROJECTION
370
373
372
371
374
335

Figure 14:
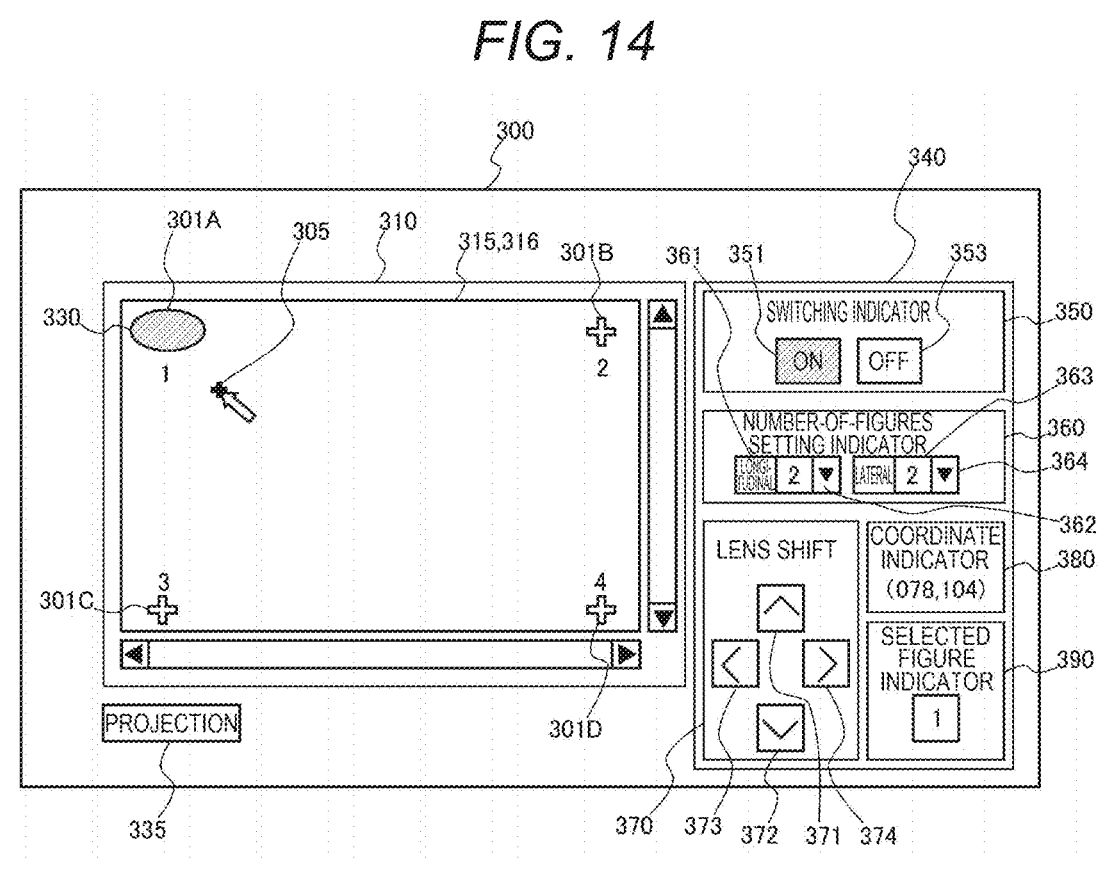

300
340
301A 305 310 315,316 301B 361 351 353
330
SWITCHING INDICATOR
ON OFF
350
1 2
363
NUMBER-OF-FIGURES SETTING INDICATOR
360
LONGITUDINAL 2 LATERAL 2
364
362
LENS SHIFT
COORDINATE INDICATOR (078,104)
380
3 4
301C
SELECTED FIGURE INDICATOR
1
390
PROJECTION
301D
335 370 373 372 371 374

DISPLAY METHOD, INFORMATION PROCESSING DEVICE, AND NON-TRANSITORY COMPUTER-READABLE STORAGE MEDIUM STORING PROGRAM

The present application is based on, and claims priority from JP Application Serial Number 2024-007271, filed Jan. 22, 2024, the disclosure of which is hereby incorporated by reference herein in its entirety.

BACKGROUND

1. Technical Field

The present disclosure relates to a display method, an information processing device, and a non-transitory computer-readable storage medium storing a program.

2. Related Art

There has been known a technique for correcting, with remote control by an information processing device, an image projected by a projection device.

For example, JP-A-2019-125955 discloses a parameter generation device that generates a deformation parameter used in a projection device including geometric correction means.

JP-A-2019-125955 is an example of the related art.

However, when the image projected by the projection device is corrected by the remote control by the information processing device, even if a user operates the information processing device, it is sometimes difficult to understand whether an operation result of the user is reflected on the image projected by the projection device. For example, when a part of the image projected by the projection device is displayed off a projection target screen or the like, the user sometimes has difficulty in recognizing a change in an image displayed on the outer side of the screen.

SUMMARY

According to an aspect of the present disclosure, there is provided a display method in a projection system including a projection device and an information processing device, the method including: projecting a first image including a first figure from the projection device; displaying, with the information processing device, a second image including a second figure corresponding to the first figure on a display device different from the projection device; when moving operation of moving a position of the first figure is received by the information processing device, causing the information processing device to display, on the second image, in correlation with the second figure, a movement indicator indicating that the first figure is moved in the first image; and projecting the first figure after the movement from the projection device.

According to an aspect of the present disclosure, there is provided an information processing device including one or a plurality of processors that control a display device, wherein the one or the plurality of processors execute: displaying, on the display device, a second image including a second figure corresponding to a first figure included in a first image projected from a projection device; when moving operation of moving a position of the first figure is received, displaying, on the second image, in correlation with the second figure corresponding to the first figure selected by the moving operation, a movement indicator indicating that the first figure is moved in the first image; and transmitting a projection instruction for the first figure after the movement to the projection device.

According to an aspect of the present disclosure, there is provided a non-transitory computer-readable storage medium storing a program for causing a processor mounted on an information processing device, which controls a display device, to execute: causing the display device to display a second image including a second figure corresponding to a first figure included in a first image projected from a projection device; when moving operation of moving a position of the first figure is received, displaying, on the second image, in correlation with the second figure, a movement indicator indicating that the first figure is moved in the first image; and transmitting a projection instruction for the first figure after the movement to the projection device.

BRIEF DESCRIPTION OF THE DRAWINGS

FIG. 7 is a diagram illustrating a third figure.

FIG. 9 is a diagram illustrating a display example 1 of a setting screen.

FIG. 14 is a diagram illustrating a display example 5 of the setting screen.

DESCRIPTION OF EMBODIMENTS

1. Configuration of a Projection System

An embodiment of the present disclosure is explained below with reference to the accompanying drawings.

Figure 1:
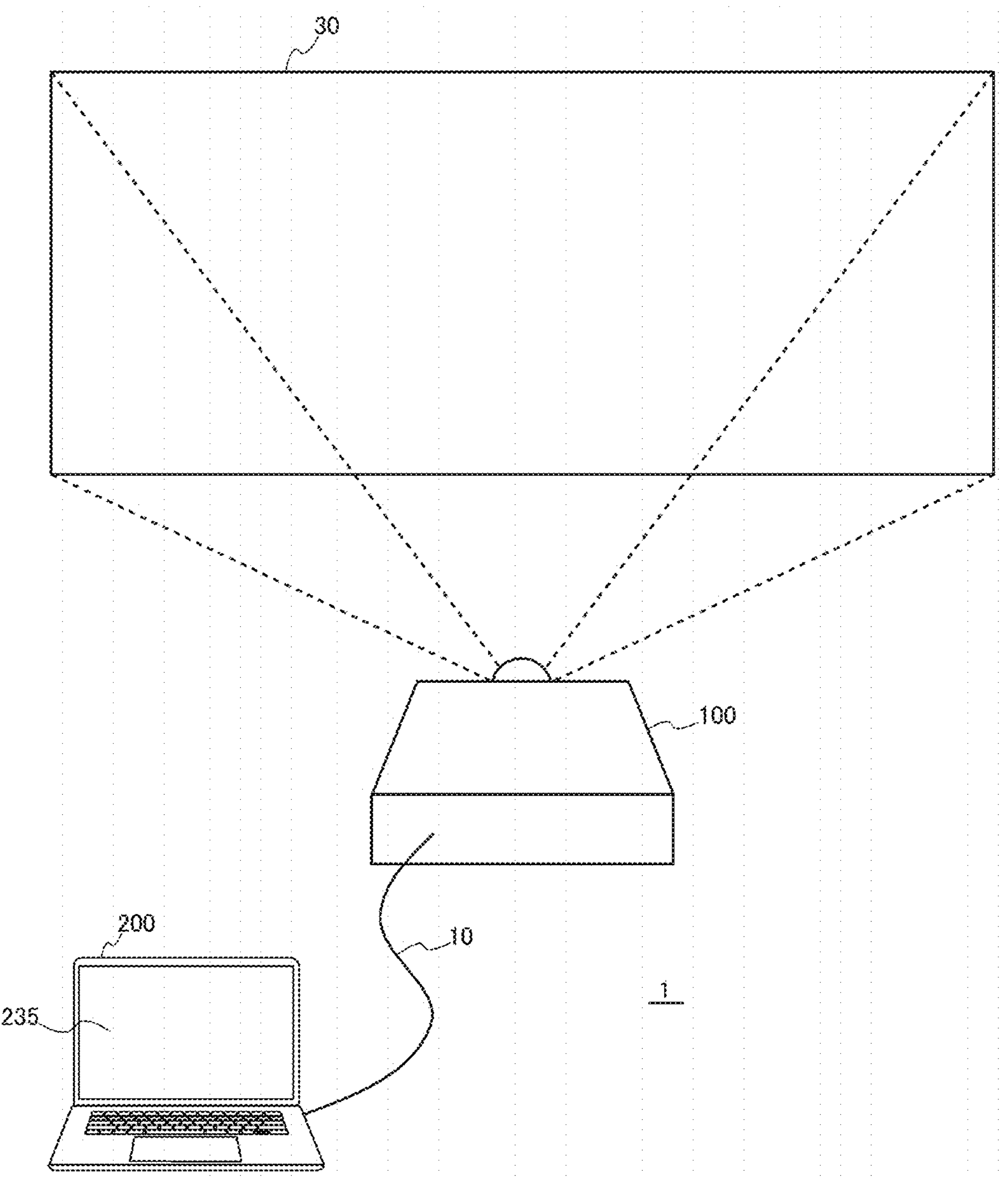
FIG. 1 is a diagram illustrating a system configuration of a projection system.

FIG. 1 is a diagram illustrating a system configuration of a projection system 1.

The projection system 1 includes a projector 100 and an information processing device 200. The information processing device 200 and the projector 100 are connected by a cable 10. FIG. 1 illustrates an example in which the information processing device 200 and the projector 100 are connected by wire by the cable 10. However, the information processing device 200 and the projector 100 may be connected by radio. The information processing device 200 and the projector 100 may be connected via a network. The projector 100 is equivalent to an example of a projection device.

The projector 100 displays a video on a projection target 30 by projecting image light onto the projection target 30. The projection target 30 may be a curtain-like screen or may be a wall surface of a building or a surface of an installed object.

The information processing device 200 supplies a signal including image data to be displayed by the projector 100 to the projector 100. The signal including the image data transmitted from the information processing device 200 to the projector 100 is referred to as display signal. As the information processing device 200, for example, a personal computer such as a desktop personal computer or a laptop computer or a mobile terminal such as a smartphone or a tablet personal computer is used.

2. Configuration of the Projector

Figure 2:
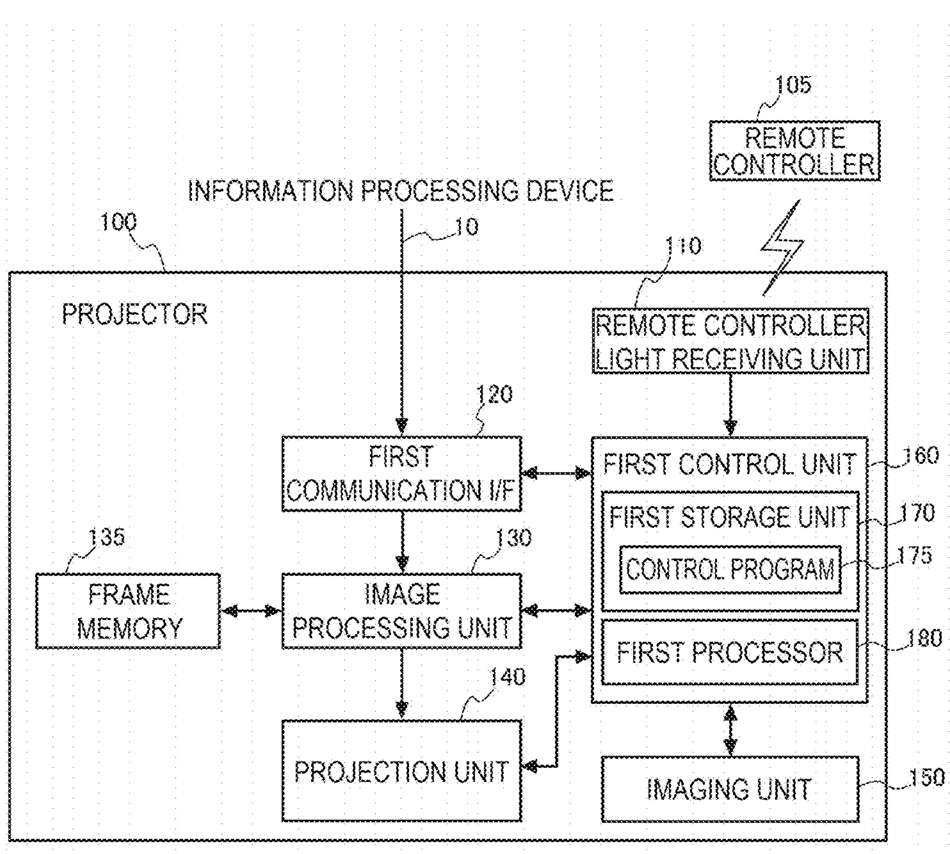
FIG. 2 is a block diagram illustrating a configuration of a projector.

FIG. 2 is a block diagram illustrating a configuration of the projector 100.

The configuration of the projector 100 is explained with reference to FIG. 2.

The projector 100 includes a remote controller light receiving unit 110, a first communication interface 120, an image processing unit 130, a frame memory 135, a projection unit 140, an imaging unit 150, and a first control unit 160. In the following explanation, interface is abbreviated as I/F.

The remote controller light receiving unit 110 is a receiving device for an infrared signal and includes a light receiving element and a decoder not illustrated in FIG. 2. The remote controller light receiving unit 110 receives and decodes an infrared signal transmitted from a remote controller 105. The remote controller light receiving unit 110 decodes the infrared signal and outputs an instruction signal corresponding to an operated operation key or button of the remote controller 105 to the first control unit 160. The remote controller light receiving unit 110 may be configured to receive a radio signal of Bluetooth or the like from the remote controller 105. When receiving the radio signal, the remote controller light receiving unit 110 may include an antenna and a reception circuit. Bluetooth is a registered trademark.

The first communication I/F 120 is connected to the information processing device 200 via the cable 10 and performs data communication with the information processing device 200. The first communication I/F 120 is, for example, a wired interface including a connection terminal such as a USB (Universal Serial Bus) connector or an Ethernet connector and an interface circuit. The first communication I/F 120 may be a wireless communication interface. The first communication I/F 120 receives a display signal and extracts image data included in the received display signal. The first communication I/F 120 outputs the extracted image data to the image processing unit 130. Ethernet is a registered trademark.

The frame memory 135 is connected to the image processing unit 130. The frame memory 135 includes a plurality of banks. The banks have a storage capacity capable of writing image data for one frame. The frame memory 135 is configured by, for example, an SDRAM (Synchronous Dynamic RAM). The image processing unit 130 loads the image data input from the first communication I/F 120 in the frame memory 135.

The image processing unit 130 loads the image data input from the first communication I/F 120 in the frame memory 135. The image processing unit 130 processes the image data loaded in the frame memory 135 in synchronization with a synchronization signal input from the first communication I/F 120.

The image processing performed by the image processing unit 130 includes, for example, resolution conversion processing, resizing processing, distortion aberration correction, shape correction processing, digital zoom processing, and adjustment of an image tint and luminance. The image processing unit 130 performs processing designated by the control unit 160 and performs, according to necessity, the processing using a parameter input from the first control unit 160. Naturally, the image processing unit 130 can combine a plurality of kinds of image processing among the kinds of processing explained above.

The image processing unit 130 and the frame memory 135 are configured by, for example, an integrated circuit. The integrated circuit includes an LSI (Large Scale Integrated Circuit), an ASIC (Application Specific Integrated Circuit), a PLD (Programmable Logic Device), an FPGA (Field-Programmable Gate Array), and an SoC (System-on-a-chip). A part of the configuration of the integrated circuit may include an analog circuit. The first control unit 160 and the integrated circuit may be combined.

The projection unit 140 is connected to the first control unit 160. The projection unit 140 includes, for example, a light source, a light modulation device, and a projection optical system. The light source is turned on according to the control of the first control unit 160 and emits light toward the light modulation device. A specific configuration of the light source is not limited. Examples of the light source include lamps such as a halogen lamp, a xenon lamp, and an ultra-high pressure mercury lamp and solid light sources such as an LED or a laser light source. The light modulation device modulates the light emitted by the light source. A specific configuration of the light modulation device is not limited. For example, the light modulation device can be configured by a transmissive liquid crystal panel, a reflective liquid crystal panel, or a digital mirror device. In the present embodiment, a case in which the light modulation device includes a transmissive liquid crystal panel is explained. The projection optical system provided in the projection unit 140 includes a lens, a mirror, a prism, and the like for forming an image of image light modulated by the light modulation device on the projection target 30.

The projection unit 140 may include a light source drive circuit that supplies electric power to the light source and a drive circuit that causes the light modulation device to execute drawing. The projection unit 140 may include a zoom mechanism and a focus adjustment mechanism that adjusts a focus.

The imaging unit 150 is a camera including a not-illustrated imaging element such as a charge-coupled device (CCD) sensor or a complementary metal-oxide semiconductor (CMOS) sensor. The imaging unit 150 repeats imaging based on the control of the first control unit 160 and sequentially outputs a captured image, which is an imaging result, to the first control unit 160.

The first control unit 160 is a computer device including a first storage unit 170 and a first processor 180.

The first storage unit 170 includes a RAM (Random Access Memory) and a ROM (Read Only Memory). The RAM is used to temporarily store various data and the like and the ROM stores a control program 175 for controlling an operation of the projector 100, various kinds of setting information, and the like.

The first processor 180 is an arithmetic processing device configured by a CPU (Central Processing Unit) or an MPU (Micro-Processing Unit). The first processor 180 executes the control program 175 to control the units of the projector 100. The first processor 180 may be configured by a single processor or can be configured by a plurality of processors. The first processor 180 may be configured by a part or the entire first storage unit 170 or an SoC integrated with another circuit. The first processor 180 may be configured by a combination of a CPU that executes a program and a DSP that executes predetermined arithmetic processing. Further, all of the functions of the first processor 180 may be implemented in hardware or may be configured using a programmable device.

3. Configuration of the Information Processing Device

Figure 3:
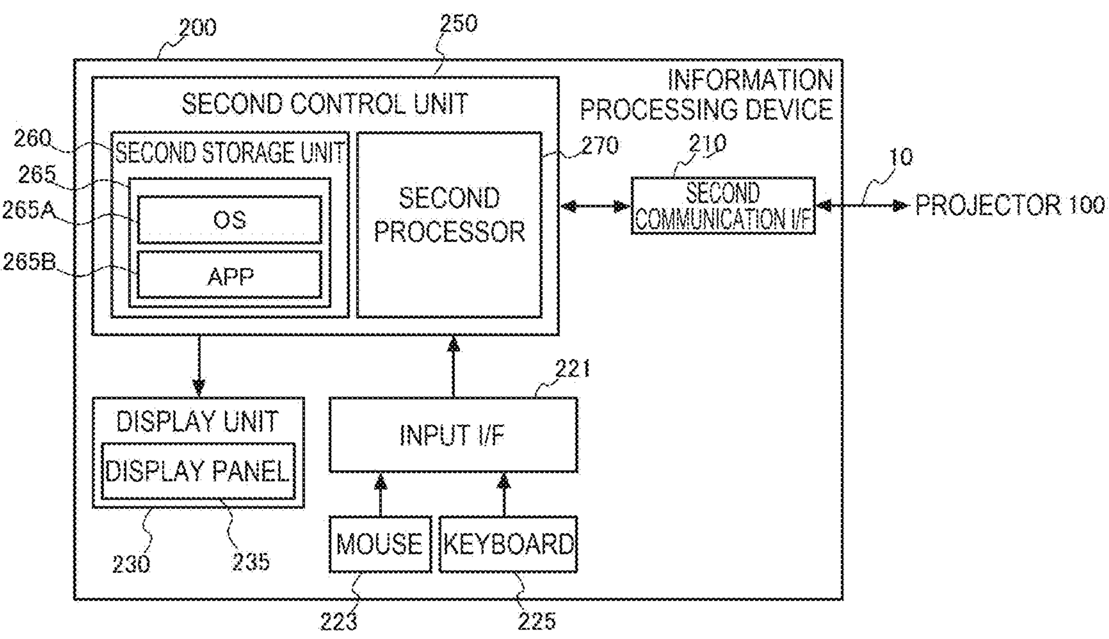
FIG. 3 is a block diagram illustrating a configuration of an information processing device.

FIG. 3 is a block diagram illustrating a configuration of the information processing device 200.

The configuration of the information processing device 200 is explained with reference to FIG. 3.

The information processing device 200 includes a second communication I/F 210, an input I/F 221, a mouse 223, a keyboard 225, a display unit 230, and a second control unit 250.

The second communication I/F 210 is connected to the projector 100 via the cable 10 and performs data communication with the projector 100 each other. The second communication I/F 210 is, for example, a wired interface including a connection terminal such as a USB connector or an Ethernet connector and an interface circuit. The second communication I/F 210 may be a wireless communication interface. Ethernet is a registered trademark.

The input I/F 221 is connected to the mouse 223 and the keyboard 225, which are input devices, and receives operation by these input devices. The input I/F 221 outputs an operation signal corresponding to the received operation to the second control unit 250. The second control unit 250 receives the input of the operation signal to determine that the operation is received. The mouse 223 is equivalent to a first operation device and the keyboard 225 is equivalent to a second operation device.

The mouse 223 receives click, drag, and drop of a left button as operation in a first mode. The keyboard 225 receives operation of a cursor key as operation in a second mode.

The display unit 230 includes a display panel 235 and displays an image on the display panel 235 according to the control of the second control unit 250. For example, a liquid crystal panel or an organic electro-luminescence (EL) panel is used as the display panel 235. The display panel 235 is equivalent to a display device.

The second control unit 250 includes a second storage unit 260 and a second processor 270.

The second storage unit 260 includes a volatile memory such as RAM and a nonvolatile memory such as ROM. The second storage unit 260 includes an auxiliary storage device such as a solid state drive (SSD) or a hard disk drive (HDD).

The second storage unit 260 stores an operating system (OS) 265A to be executed by the second processor 270 and a control program 265 such as an application program 265B. In the following explanation, the application program 265B is described as APP 265B.

The second processor 270 is an arithmetic processing unit configured by a CPU or an MPU. The second processor 270 executes the OS 265A and the application 265B to control the units of the information processing device 200. The second processor 270 may be configured by a single processor or can be configured by a plurality of processors. The second processor 270 may be configured by a part or the entire second storage unit 260 or an SoC integrated with another circuit. The second processor 270 may be configured by a combination of a CPU that executes a program and a DSP that executes predetermined arithmetic processing. Further, all of the functions of the second processor 270 may be implemented in hardware or may be configured using a programmable device.

4. Operations of the Information Processing Device and the Projector

Subsequently, operations of the information processing device 200 and the projector 100 are explained.

When the information processing device 200 receives, with the input I/F 221, operation of selecting the APP 265B, the second control unit 250 executes the selected APP 265B. The APP 265B is an APP that sets, in a projectable range 40 in which the projector 100 is capable of projecting image light, a range for causing the projector 100 to actually display a display image. The range for causing the projector 100 to actually display the display image is referred to as projection range 60. The projectable range 40 indicates a range in which an image can be projected when a display image is displayed using the entire region of the transmissive liquid crystal panel. The projectable range 40 and the projection range 60 are explained with reference to FIG. 5.

Figure 4:
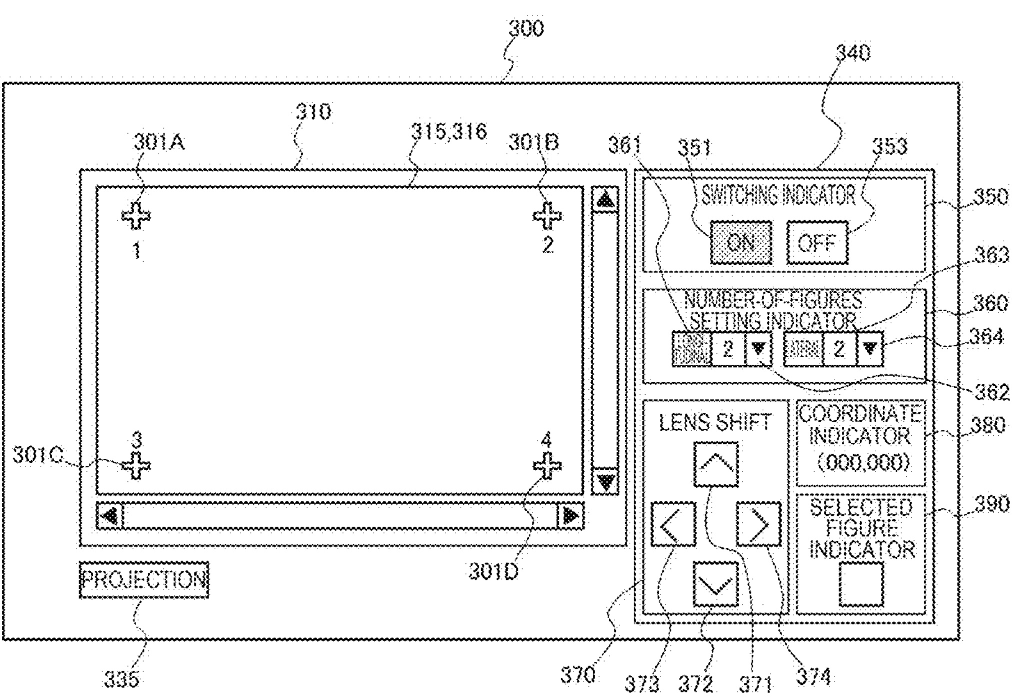
FIG. 4 is a diagram illustrating an example of an APP screen.

FIG. 4 is a diagram illustrating an example of an APP screen 300 displayed on the display panel 235 of the information processing device 200.

The second control unit 250 executes the APP 265B to cause the display panel 235 to display the APP screen 300 illustrated in FIG. 4. FIG. 4 is a diagram illustrating an example of the APP screen 300.

The APP screen 300 includes a first region 310 and a second region 340. A projection button 335 for instructing projection of an adjustment image 50 is displayed on the APP screen 300.

A setting screen 315 is displayed in the first region 310. On the setting screen 315, a setting image 316 including the second figure 301 is displayed. The setting image 316 is equivalent to a second image. The second figure 301 is a figure used for setting the projection range 60. The number and the position of the second figure 301 displayed on the setting screen 315 can be changed by the user operating the second region 340. FIG. 4 illustrates, as the second figure 301, an example in which four second figures 301 are disposed at four corners of the setting screen 315. In the drawing view, the second figure 301 located on the upper left of the setting screen 315 is referred to as second figure 301A and the second figure 301 located on the upper right of the setting screen 315 is referred to as second figure 301B. In the drawing view, the second figure 301 located on the lower left of the setting screen 315 is referred to as second figure 301C and the second figure 301 located on the lower right of the setting screen 315 is referred to as second figure 301D.

Although FIG. 4 illustrates an example in which a cross-shaped figure is displayed as the second figure 301, the shape of the second figure 301 is optional. Although FIG. 4 illustrates a case in which the shapes of the second figures 301A, 301B, 301C, and 301D are all the same, at least one of the shapes and the colors of the second figures 301A, 301B, 301C, and 301D may be different.

In the second region 340, a switching indicator 350, a number-of-figures setting indicator 360, a lens shift 370, a coordinate indicator 380, and a selected figure indicator 390 are displayed.

The switching indicator 350 receives operation of switching whether to cause the setting screen 315 to display the second figure 301. In the switching indicator 350, an ON button 351 and an OFF button 353 are displayed. When the ON button 331 is selected, the second figure 301 is displayed on the setting screen 315. When the OFF button 333 is selected, the second figure 301 displayed on the setting screen 315 is erased.

The number-of-figures setting indicator 360 is an indicator for receiving operation of setting the number of the second figures 301 displayed by the setting screen 315.

In the number-of-figures setting indicator 360, a display field 361 for displaying the number of second figures 301 displayed in the longitudinal direction of the setting screen 315 and an operation piece 362 for receiving operation of changing the number of second figures 301 displayed in the longitudinal direction of the setting screen 315 are displayed in the drawing view.

In the number-of-figures setting indicator 360, a display field 363 for displaying the number of second figures 301 displayed in the lateral direction of the setting screen 315 and an operation piece 364 for receiving operation of changing the number of second figures 301 displayed in the lateral direction of the setting screen 315 are displayed in the drawing.

In the lens shift 370, arrow keys 371, 372, 373, and 374 corresponding to the up, down, left, and right directions are displayed. The user can transmit an instruction to shift the position of a projection lens provided in the projection optical system provided in the projection unit 140 of the projector 100 to the projector 100 by operating the arrow keys 371, 372, 373, and 374 with the mouse 223. Accordingly, the user can change the position of an image projected onto the projection target 30 by the projection unit 140.

In the coordinate indicator 380, when the first figure 51 corresponding to the second figure 301 selected by the user is moved on the adjustment image 50, a movement amount on the adjustment image 50 is displayed.

The coordinate indicator 380 includes a longitudinal direction movement amount and a lateral direction movement amount. The longitudinal direction movement amount is a longitudinal direction movement amount of the adjustment image 50. The lateral direction movement amount is a lateral direction movement amount of the adjustment image 50. The coordinate indicator 380 is equivalent to an example of a movement indicator. The coordinate indicator 380 is equivalent to an example of a direction indicator. The coordinate indicator 380 is equivalent to an example of a movement amount indicator indicating a movement amount of the first figure.

In the selected figure indicator 390, a serial number of the second figure 301 selected by operation of the user among the second figures 301 displayed on the setting screen 315 is displayed.

As illustrated in FIG. 4, serial numbers are respectively displayed in the second figures 301A, 301B, 301C, and 301D displayed at the four corners of the setting screen 315. In the selected figure indicator 390, a serial number of the second figure selected by the user among the second figure 301 is displayed.

Figure 5:
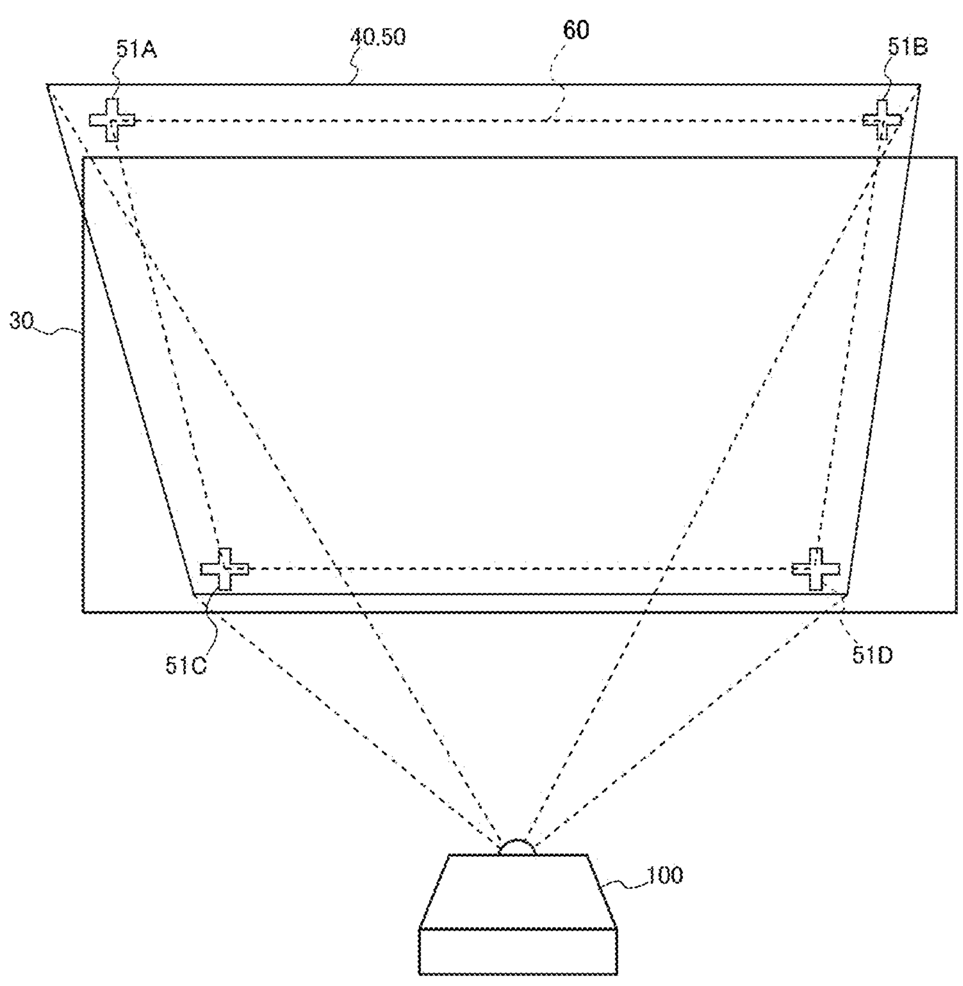
FIG. 5 is a diagram illustrating an adjustment image projected onto a projection target.

FIG. 5 is a diagram illustrating the adjustment image 50 projected on the projection target 30.

The adjustment image 50 includes the first figures 51. The adjustment image 50 is equivalent to an example of a first image. FIG. 5 illustrates an example in which the first figures 51 are respectively displayed at the four corners of the adjustment image 50. In the drawing view, the first figure 51 located on the upper left of the adjustment image 50 is referred to as first figure 51A and the first figure 51 located on the upper right of the adjustment image 50 is referred to as first figure 51B. In the drawing view, the first figure 51 located on the lower left of the adjustment image 50 is referred to as first figure 51C and the first figure 51 located on the lower right of the adjustment image 50 is referred to as first figure 51D.

The first figures 51 correspond to the second figures displayed on the setting screen 315.

The second figure 301A displayed on the setting screen 315 illustrated in FIG. 4 corresponds to the first figure 51A. The second figure 301B displayed on the setting screen 315 corresponds to the first figure 51B. The second figure 301C displayed on the setting screen 315 corresponds to the first figure 51C. The second figure 301D displayed on the setting screen 315 corresponds to the first figure 51D.

A display position of the first figure 51A in the adjustment image 50 corresponds to the position of the second figure 301A on the setting screen 315.

A display position of the first figure 51B in the adjustment image 50 corresponds to the position of the second figure 301B on the setting screen 315.

A display position of the first figure 51C in the adjustment image 50 corresponds to the position of the second figure 301C on the setting screen 315.

A display position of the first figure 51D in the adjustment image 50 corresponds to the position of the second figure 301D on the setting screen 315.

The first figures 51A, 51B, 51C, and 51D are figures specifying a projection range 60 that is a range for causing the projector 100 to actually display a display image in the projectable range 40.

For example, as illustrated in FIG. 5, regions defined by line segments connecting the centers of the first figures 51A, 51B, 51C, and 51D disposed at the four corners of the adjustment image 50 are set in the projection range 60.

When the user presses the projection button 335 displayed on the APP screen 300, the second control unit 250 generates adjustment image data that is a source of the adjustment image 50 and transmits the generated adjustment image data to the projector 100. The projector 100 generates image light based on the received adjustment image data, and projects the generated image light onto the projection target 30. Accordingly, the adjustment image 50 is displayed on the projection target 30.

The user operates the input device while visually checking the adjustment image 50 projected on the projection target 30 and the display panel 235 to perform operation for the second figure 301, that is, changes the position of the second figure 301 on the setting screen 315. In other words, the information processing device 200 receives operation for the second figure 301 from the user. By changing the position of the second figure 301 on the setting screen 315, the position of the first figure 51 in the adjustment image 50 is also changed and the projection range 60 is changed.

At this time, when the projection target 30 onto which the projector 100 projects an image is not a screen but, for example, a wall surface of a building or a curved surface, a part of the adjustment image 50 is sometimes displayed on the outer side of the projection target 30. When the first figure 51 is included in a part of the adjustment image 50 displayed on the outer side of the projection target 30, the visibility of the first figure 51 is deteriorated. For this reason, even if the user operates the information processing device 200 to perform operation of changing the display position of the first image 51, it is sometimes difficult for the user to grasp whether the display position of the first figure 51 has been changed.

Subsequently, operation of operating the setting screen 315 to change the display position of the first figure 51 in the adjustment image 50 is explained.

Figure 6:
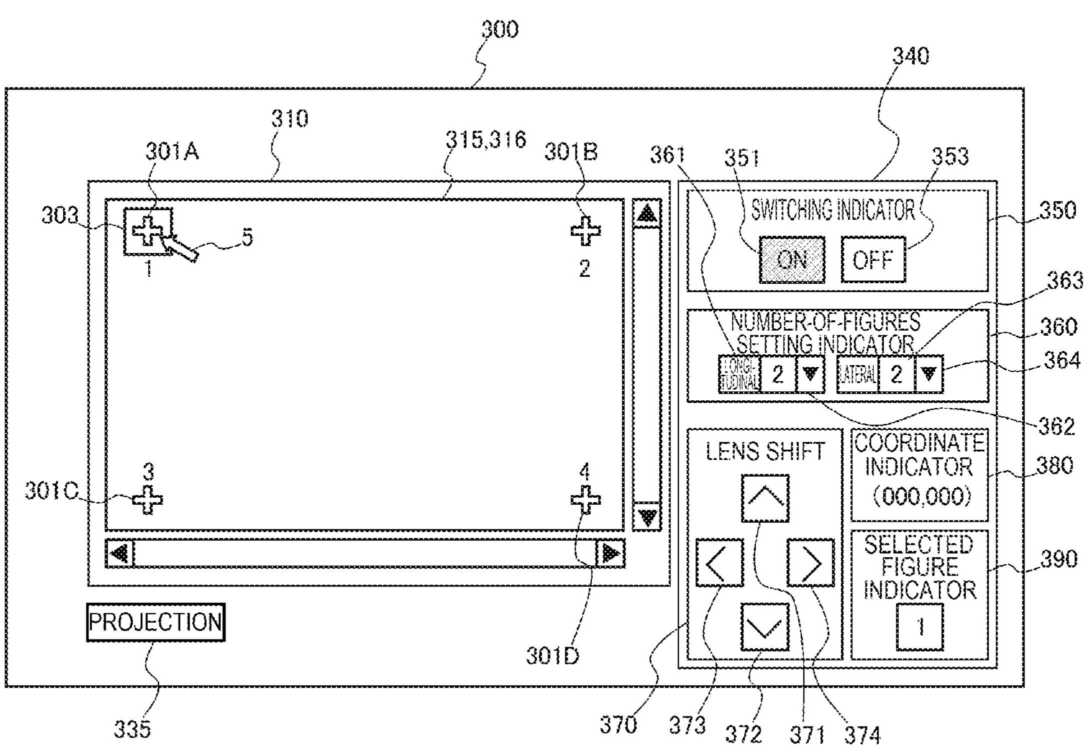
FIG. 6 is a diagram illustrating a state in which a second figure is selected.

FIG. 6 is a diagram illustrating a state in which the second figure 301A is selected.

First, the user operates the mouse 223 to place a mouse cursor 5 on the second figure 301 corresponding to the first figure 51, the display position of which is desired to be changed. When the user left-clicks the mouse 223, the second figure 301 on which the mouse cursor 5 is placed is selected.

When receiving operation of selecting any one of the second figures 301 according to the left click operation of the mouse 223, the second control unit 250 causes the projector 100 to display a rectangular FIG. 303 surrounding the selected second figure 301 as illustrated in FIG. 6. FIG. 6 illustrates a state in which the second figure 301A is selected and the second FIG. 301A is surrounded by the rectangular figure 303. "1" which is a serial number of the selected second figure 301A, is displayed in the selected figure indicator 390.

FIG. 7 is a diagram illustrating a third figure 305.

Subsequently, moving operation using the mouse 223 is explained.

The user moves, with drag and drop operation of the mouse 223, the mouse cursor 5 to a position where the second figure 301 is desired to be displayed. Specifically, the user presses the left button of the mouse 223 in a state in which the mouse cursor 5 is placed on the selected second figure 301, moves the mouse cursor 5 to the position where the second figure 301 is desired to be displayed while keeping pressing the left button of the mouse 223, and releases the pressing of the left button of the mouse 223 at the position where the mouse cursor 5 is desired to be moved. The drag and drop operation is equivalent to operation of designating a position after the movement of the first figure 51.

The second control unit 250 causes the projector 100 to display the third figure 305 at the position where the pressing of the left button of the mouse 223 is released. The third figure 305 is a figure that is congruous with or similar to the second figure 301.

After causing the projector 100 to display the third figure 305 on the setting screen 315, the second control unit 250 moves a display position of the first figure 51A corresponding to the selected second figure 301A stepwise.

The second control unit 250 calculates a moving direction and a movement amount in the case in which the second figure 301A is moved from the current position to the position of the third figure 305 on the setting screen 315. The second control unit 250 moves, based on the calculated moving direction and the calculated movement amount, the position of the first figure 51A in the adjustment image 50 projected by the projector 100.

The resolution of the setting screen 315 and the resolution of the transmissive liquid crystal panel provided in the light modulation device are different. For this reason, the second control unit 250 converts the moving direction and the movement amount calculated on the setting screen 315 into a moving direction and a movement amount in the transmissive liquid crystal panel based on the resolution of the setting screen 315 and the panel resolution of the transmissive liquid crystal panel.

Subsequently, when acquiring the moving direction and the movement amount in the transmissive liquid crystal panel, the second control unit 250 sequentially generates adjustment image data obtained by moving the position of the first figure 51A included in the adjustment image 50 by a preset movement amount at a time in the acquired moving direction. The second control unit 250 outputs the sequentially generated adjustment image data to the projector 100 and causes the projector 100 to project the adjustment image 50 based on the adjustment image data.

The second control unit 250 may not change the display position of the second figure 301A on the setting screen 315 during the movement of the first figure 51A. That is, the position of the second figure 301A on the setting screen 315 at the time when the position of the first figure 51A is the first position, which is the position before the change, and the position of the second figure 301 at the time when the position of the first FIG. 51A is the second position different from the first position may be the same. When the adjustment image 50 is projected with a curved surface or a structure such as a building set as the projection target 30, even if the first figure 51A and the second figure 301A are moved, the movement of the first figure 51A in the adjustment image 50 and the movement of the second figure 301A on the setting screen 315 sometimes do not coincide to confuse the user. For this reason, even when the display position of the first figure 51A is moved in the adjustment image 50, the second figure 301A is not moved on the setting screen 315.

When the movement of the first figure 51A in the adjustment image 50 is completed, the second control unit 250 erases the third figure 305 from the setting screen 315.

Figure 8:
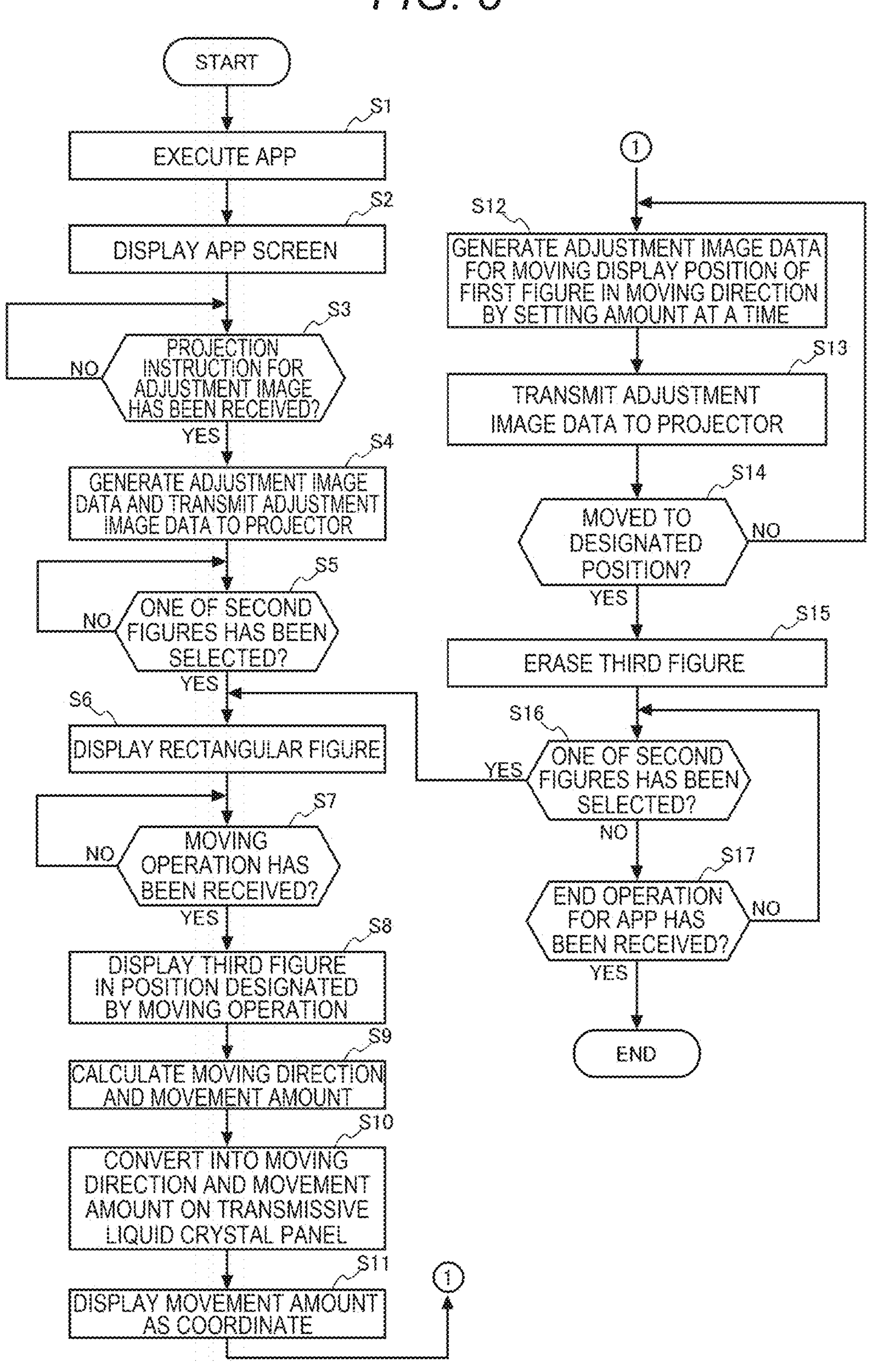
FIG. 8 is a flowchart illustrating an operation of the information processing device.

FIG. 8 is a flowchart illustrating an operation of the information processing device 200.

The operation of the information processing device 200 is explained with reference to a flowchart illustrated in FIG. 8.

When receiving operation of selecting the APP 265B with the input I/F 221, the second control unit 250 executes the APP 265B (step S1) and causes the display panel 235 to display the APP screen 300 (step S2).

After causing the display panel 235 to display the APP screen 300, the second control unit 250 determines whether the projection button 335 has been pressed and a projection instruction for the adjustment image 50 has been received (step S3). When the projection instruction for the adjustment image 50 has not been received (step S3/NO), the second control unit 250 stays on standby until the projection instruction is received.

When receiving the projection instruction for the adjustment image 50 (step S3/YES), the second control unit 250 generates adjustment image data and transmits the generated adjustment image data to the projector 100 (step S4).

Subsequently, the second control unit 250 determines whether operation of selecting any one of the second figures 301 has been received (step S5). When the operation of selecting any one of the second figures 301 has not been received (Step S5/NO), the second control unit 250 stays on standby until operation of selecting any one of the second figure 301 is received.

When receiving operation of selecting any one of the second figures 301 (step S5/YES), the second control unit 250 causes the setting screen 315 to display the rectangular figure 303 surrounding the selected second figure 301 (step S6).

Subsequently, the second control unit 250 determines whether moving operation of designating a moving destination of the selected second figure 301 has been received (step S7). When the moving operation has not been received (step S7/NO), the second control unit 250 stays on standby until the moving operation is received.

When receiving the moving operation (step S7/YES), the second control unit 250 causes the setting screen 315 to display the third figure 305 at a position of the setting screen 315 designated by the moving operation (step S8). Subsequently, the second control unit 250 calculates a moving direction and a movement amount in the case of movement from the position of the selected second figure 301 to the position of the third figure 305 (step S9).

Subsequently, the second control unit 250 converts the calculated moving direction and the calculated movement amount into a moving direction and a movement amount in the transmissive liquid crystal panel (step S10).

Subsequently, the second control unit 250 causes the coordinate indicator 380 of the second region 340 to display the calculated movement amount (step S11).

Subsequently, the second control unit 250 sequentially generates adjustment image data for moving a display position of the first figure 51 corresponding to the selected second figure 301 in the moving direction by a set amount at a time (step S12). The second control unit 250 transmits the generated adjustment image data to the projector 100 (step S13). That is, the second control unit 250 transmits a projection instruction for the first figure 51 after the movement to the projector 100. During the transmission, the second control unit 250 does not change the display position of the selected second figure 301 on the setting screen 315.

Subsequently, the second control unit 250 determines whether the first figure 51 has moved to the position designated by the moving operation (step S14). When the first figure 51 has not moved to the position designated by the moving operation (step S14/NO), the second control unit 250 returns to step S12 to generate adjustment image data.

When the first figure 51 moves to the position designated by the moving operation (step S14/YES), the second control unit 250 erases the third figure 305 from the setting screen 315 (step S15).

Subsequently, the second control unit 250 determines whether operation of selecting any one of the second figures 301 has been received (step S16). When the operation of selecting any one of the second figures 301 has been received (YES in step S16), the second control unit 250 returns to step S6 and causes the setting screen 315 to display the rectangular figure 303 around the selected second figure 301.

When one of the second figures 301 has not been selected (NO in step S16), the second control unit 250 determines whether operation to end the APP 265B has been received (step S17). When the operation to end the APP 265B has not been received (step S17/NO), the second control unit 250 returns to the determination in step S15. When receiving the operation to end the APP 265B (step S17/YES), the second control unit 250 ends this processing flow.

Figure 9:
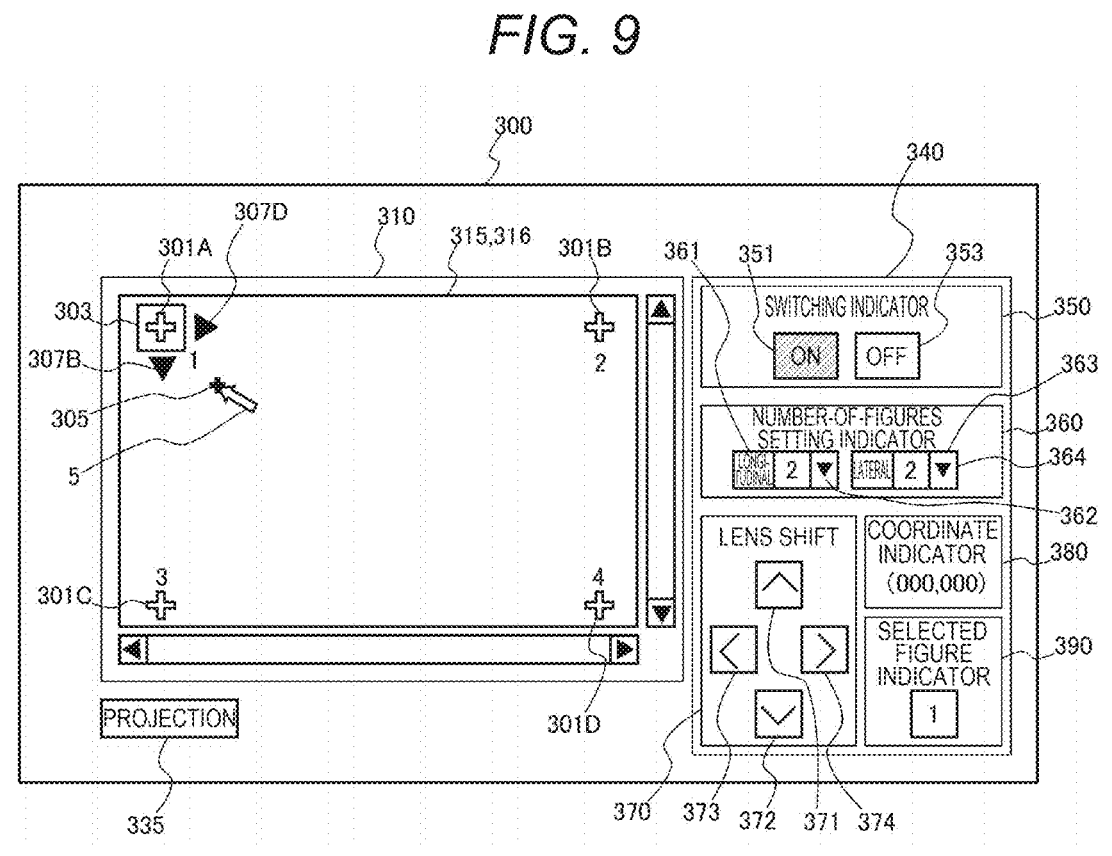

FIG. 9 is a diagram illustrating a display example 1 of the setting screen 315.

In the display example 1, while the first FIG. 51 is moved on the adjustment image 50, a moving direction of the first figure 51 is displayed by combining a plurality of arrow images 307 and the second figure 301. The plurality of arrow images 307 include arrow images 307A, 307B, 307C, and 307D corresponding to the up, down, left, and right directions. The arrow images 307A, 307B, 307C, and 307D are equivalent to a plurality of arrow images corresponding to the plurality of moving directions of the first figure 51 in a one-to-one relation. In the example illustrated in FIG. 9, the arrow image 307D in the rightward direction and the arrow image 307B in the downward direction are displayed because the moving direction from the second figure 301 to the third figure 305 is the lower right in the drawing view. The plurality of arrow images 307 are equivalent to an example of a movement indicator. The plurality of arrow images 307 are equivalent to an example of a direction indicator.

Figure 10:
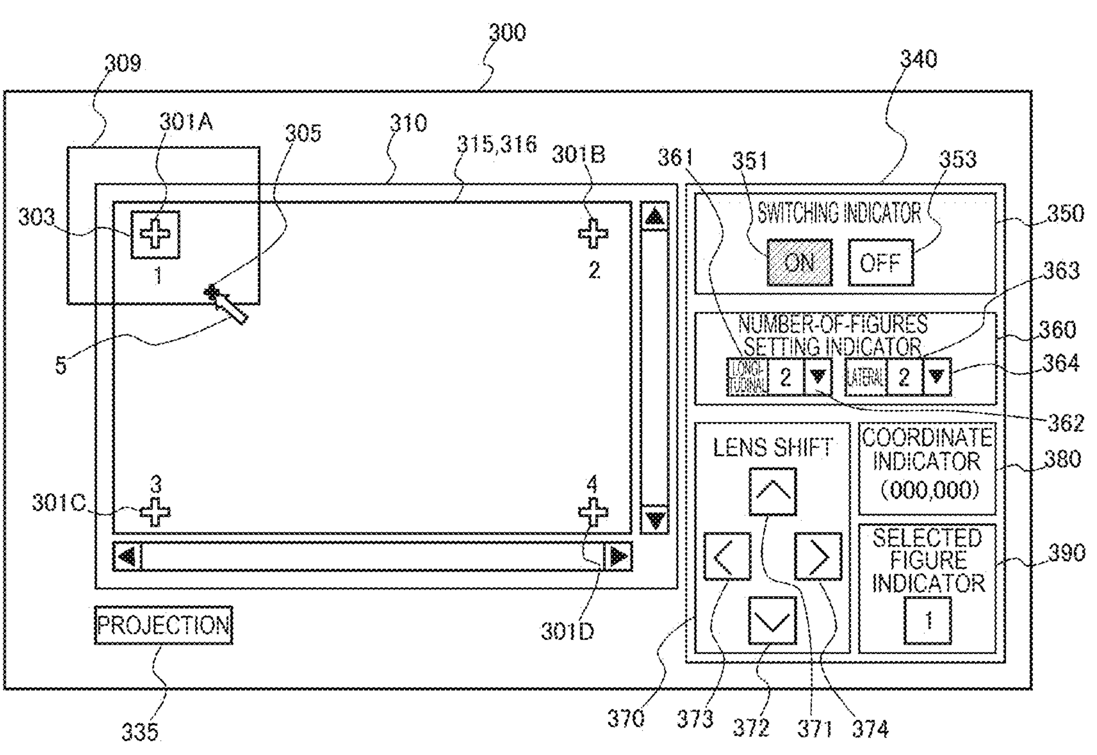
FIG. 10 is a diagram illustrating a display example 2 of the setting screen.

FIG. 10 is a diagram illustrating a display example 2 of the setting screen 315.

In the display example 2, when any one of the second figure 301 is selected and the rectangular figure 303 surrounding the selected second figure 301 is displayed, a range image 309 indicating a range in which the third figure 305 can be set is displayed. By displaying the range image 309, it is possible to cause the user to recognize the range in which the third figure 305 can be set. The user can efficiently set the third figure 305.

Figure 11:
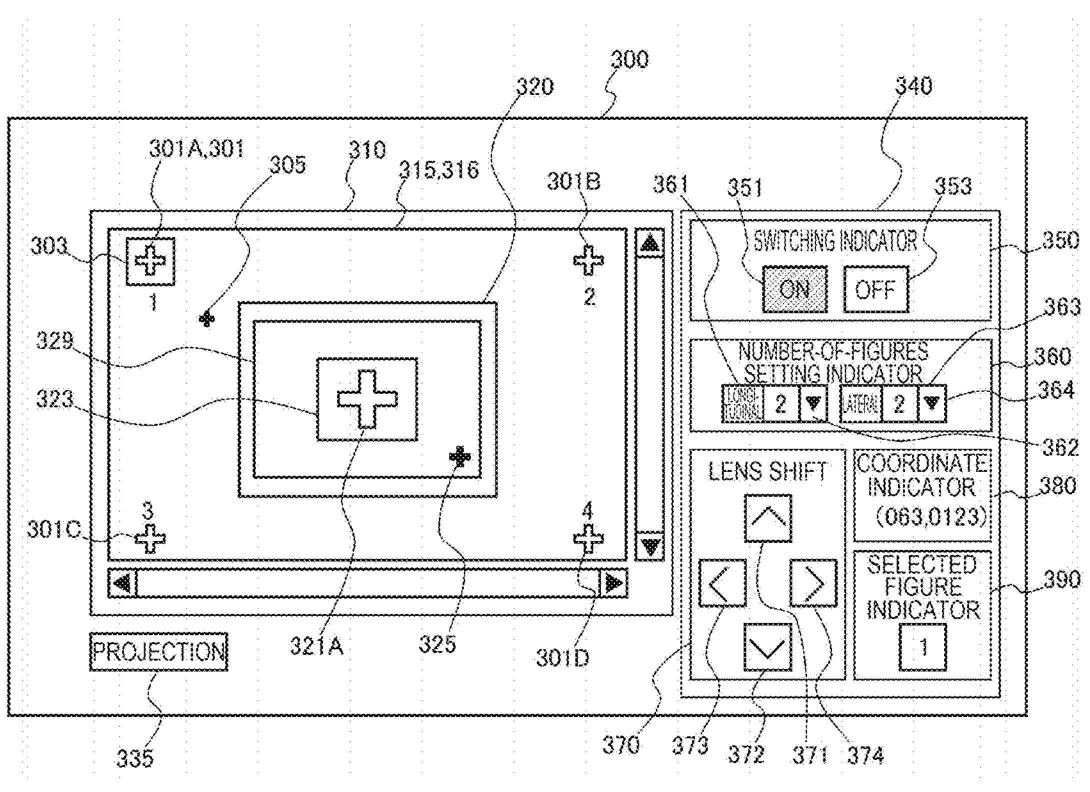
FIG. 11 is a diagram illustrating a display example 3 of the setting screen.

FIG. 11 is a diagram illustrating a display example 3 of the setting screen 315.

In the display example 3, when any one of the second figure 301 is selected and the rectangular FIG. 303 surrounding the selected second figure 301 is displayed, an enlarged image 320 of a predetermined range including the selected second figure 301 is generated and displayed to be superimposed on the setting screen 315.

In the enlarged image 320, an enlarged second figure 321A, an enlarged third figure 325, an enlarged rectangular figure 323, and an enlarged range image 329 are displayed. Display sizes of the enlarged second figure 321A, the enlarged third figure 325, the enlarged rectangular figure 323, and the enlarged range image 329 displayed in the enlarged image 320 are larger than display sizes of the second figure 301A, the third figure 305, the rectangular figure 303, and the range image 309 displayed on the setting screen 315. For this reason, the operability at the time when the user operates the setting screen 315 can be improved.

Figure 12:
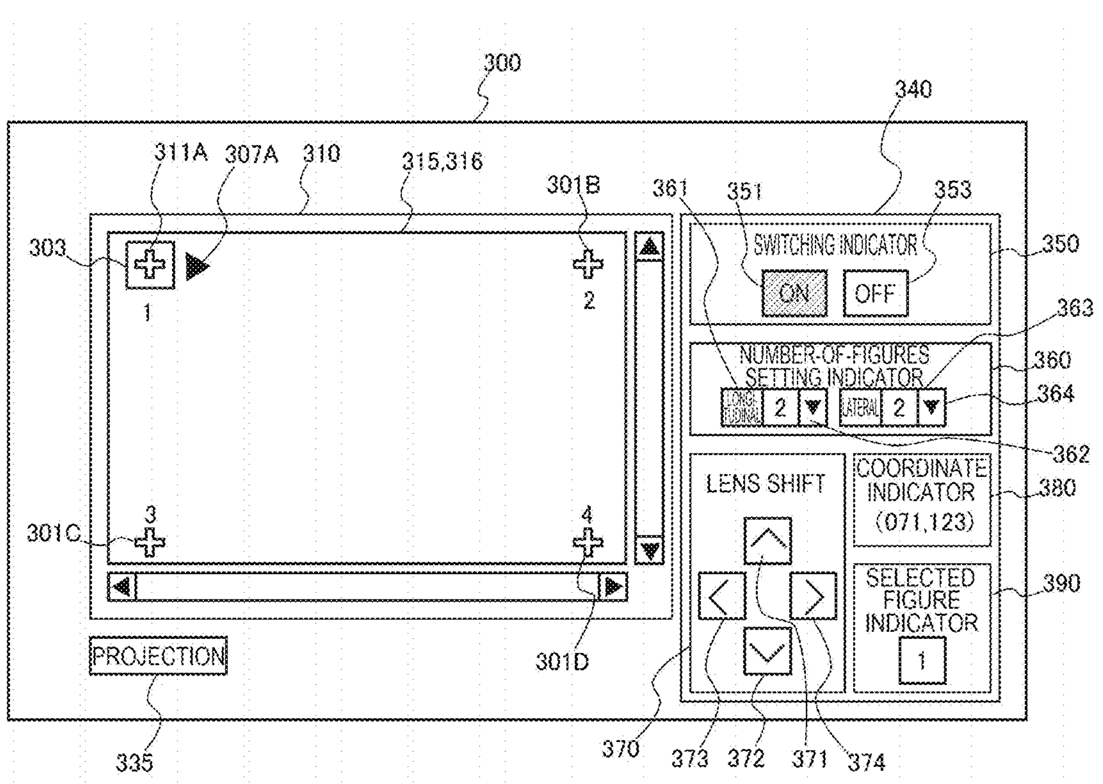
FIG. 12 is a diagram illustrating a display example 4 of the setting screen.
Figure 13:
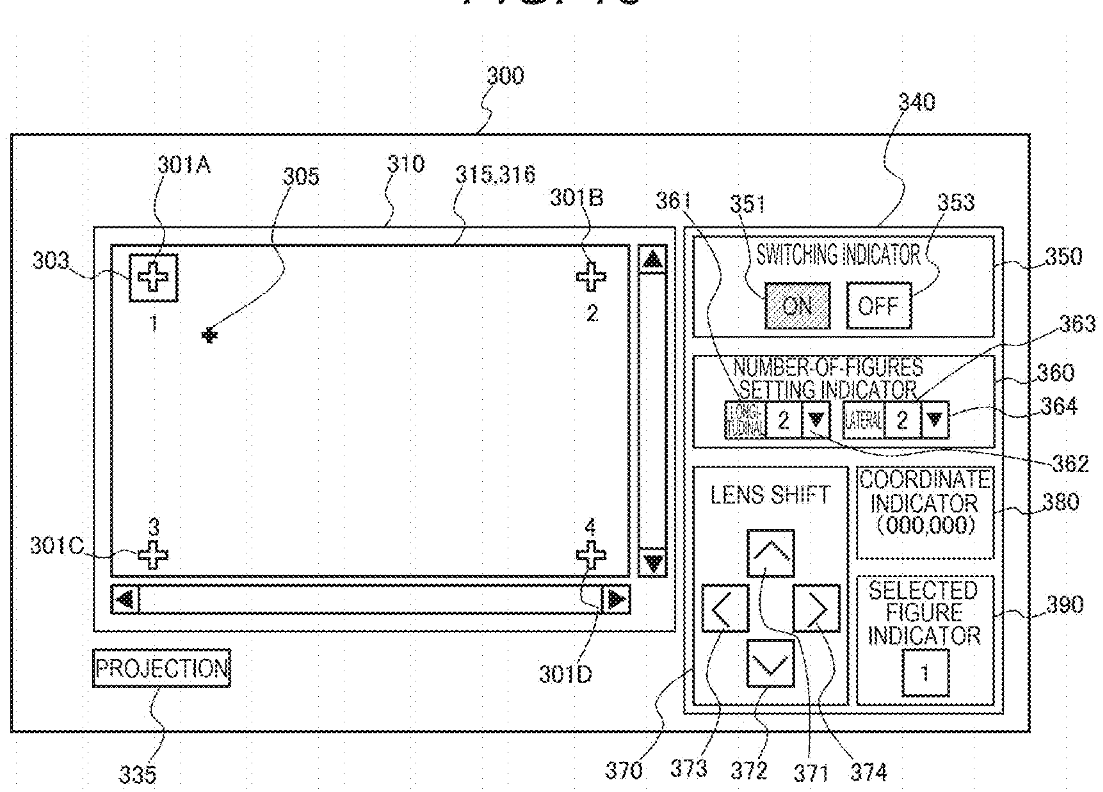
FIG. 13 is a diagram illustrating the display example 4 of the setting screen.

FIGS. 12 and 13 are diagrams illustrating a display example 4 of the setting screen 315.

FIG. 12 illustrates the setting screen 315 displayed when an operation of a plurality of cursor keys provided in the keyboard 225, which is the second operation device, is received. FIG. 13 illustrates the setting screen 315 displayed when drag operation of the mouse 223, which is the first operation device, is received.

On the setting screen 315 displayed when the operation of the cursor key of the keyboard 225 is received, the arrow image 307 is displayed as the direction indicator indicating the moving direction of the first figure 51. FIG. 12 illustrates an example in which the arrow image 307A indicating that the moving direction is the rightward direction in the drawing view is displayed. A movement amount of the first figure 51 is displayed on the coordinate indicator 380 in the second region 340. The arrow image 307A is an example of a movement indicator. The arrow image 307A is an example of a direction indicator.

On the setting screen 315 displayed when drag operation of the mouse 223 is received, the third FIG. 305 is displayed.

As explained above, by changing the display of the setting screen 315 according to an operation device that has received operation of the user, it is possible to cause the user recognize the operation device operated by the user.

FIG. 14 is a diagram illustrating a display example 5 of the setting screen 315.

In the display example 5, while the display position of the first figure 51 in the adjustment image 50 is moved, the fourth figure 330 is displayed instead of the second figure 301 corresponding to the first figure 51. The fourth figure 330 is a figure, at least one of the shape and the color of which is different from the shape or the color of the second figure 301.

FIG. 4 illustrates an example in which the fourth figure 330 having the elliptical shape is displayed instead of the cross-shaped second figure 301. However, the shape of the fourth figure 330 is not limited to the elliptical shape and only has to be different from the shape of the second figure 301. Even if the shape of the fourth figure 330 is the same as the shape of the second figure 301, the color of the fourth figure 330 only has to be different from the color of the second figure 301. As explained above, by displaying the fourth figure 330 instead of the third figure 305, it is possible to cause the user to recognize that the position of the first figure 51 of the adjustment image 50 has been changed.

5. Other Configurations

The embodiment explained above is a preferred embodiment of the present disclosure. However, the present disclosure is not limited to the embodiment explained above and various modified implementations are possible within a range not departing from the gist of the present disclosure.

For example, in the embodiment explained above, the configuration is explained in which the display unit 230 provided in the information processing device 200 is used as the display device. However, the present disclosure is not limited to this. For example, a display such as a liquid crystal display, an organic EL display, or a plasma display, which is externally connected to the information processing device 200, may be used as the display device.

In the embodiment explained above, at least the coordinate indicator 380 is displayed as an example of the movement indicator. However, the present disclosure is not limited to this. For example, only the arrow image 307A serving as the direction indicator may be displayed without the coordinate indicator 380 being displayed.

In the embodiment explained above, the movement indicator is displayed according to the operation of the user on the second figure 301 displayed on the display unit 230. However, the present disclosure is not limited to this. For example, the movement indicator may be displayed according to operation of the user on the remote controller 105. Specifically, the remote controller 105 may receive operation of moving the first figure 51, the projector 100 may receive an operation signal corresponding to the operation from the remote controller 105, the projector 100 may move the first figure 51A in the adjustment image 50 based on the operation signal, the projector 100 may transmit one of information indicating a movement amount of the first figure 51A and information indicating a moving direction of the first figure 51A to the information processing device 200, and the information processing device 200 may display, in the setting image 316, at least one of the coordinate indicator 380 based on the information indicating the movement amount of the first figure 51A or the arrow image 307A based on the information indicating the moving direction of the first figure 51A.

In the embodiment explained above, the information processing device 200 generates adjustment image data and transmits the generated adjustment image data to the projector 100. The projector 100 generates image light based on the adjustment image data received from the information processing device 200 and projects the image light onto the projection target 30. In another example, the projector 100 may generate the adjustment image data based on an instruction of the information processing device 200.

The functional units of the projector 100 illustrated in FIG. 2 indicate functional components and specific implementation forms of the functional units are not particularly limited. That is, hardware individually corresponding to the functional units does not always need to be implemented. It is naturally possible that one processor executes a program to implement functions of a plurality of functional units. A part of functions implemented by software in the embodiment explained above may be implemented by hardware or a part of functions implemented by hardware may be implemented by software. Besides, specific detailed components of the other units of the projector can be also be optionally changed in a range not departing from the scope of the present disclosure.

The functional units of the information processing device 200 illustrated in FIG. 3 indicate functional components. Specific implementation forms of the functional units are not particularly limited. That is, hardware individually corresponding to the functional units does not always need to be implemented. It is naturally possible that one processor executes a program to implement functions of a plurality of functional units. A part of functions implemented by software in the embodiment explained above may be implemented by hardware or a part of functions implemented by hardware may be implemented by software. Besides, specific detailed components of the other units of the information processing device can be also be optionally changed in a range not departing from the scope of the present disclosure.

Processing units of the flowchart illustrated in FIG. 8 are divided according to main processing contents in order to facilitate understanding of the processing of the information processing device 200. The present disclosure is not limited by a way of dividing the processing units and names of the processing units illustrated in the flowchart of FIG. 8. The processing of the second control unit 250 can be divided into more processing units according to processing contents or can be divided such that one processing unit includes more processing. The processing order of the flowchart explained above is not limited to the illustrated example.

When the program is implemented using a computer (a processor) provided in the information processing device 200 and a computer (a processor) provided in the projector 100, programs to be executed by these computers can be read by the computers (the processors) and can be configured in a form of a non-transitory recording medium. Alternatively, the programs to be executed by the computers can also be configured in a form of a transmission medium for transmitting the programs. As the recording medium, a magnetic or optical recording medium or a semiconductor memory device can be used. Specific examples of the recording medium include portable and stationary recording media such as a flexible disc, a hard disk drive (HDD), a CD-ROM, a digital versatile disc (DVD), a Blu-ray disc, a magneto-optical disc, a flash memory, and a card type recording medium. The recording medium may be a non-volatile storage device such as a RAM, a ROM, or an HDD that is an internal storage device provided in a server device. Blu-ray is a registered trademark.

6. Summary of the Present Disclosure

The present disclosure is summarized below as appendices.

Appendix 1

A display method in a projection system including a projection device and an information processing device, the method including: projecting a first image including a first figure from the projection device; displaying, with the information processing device, a second image including a second figure corresponding to the first figure on a display device different from the projection device; when moving operation of moving a position of the first figure is received by the information processing device, causing the information processing device to display, on the second image, in correlation with the second figure, a movement indicator indicating that the first figure is moved in the first image; and projecting the first figure after the movement from the projection device.

Accordingly, when the moving operation of moving the position of the first figure is received, the movement indicator indicating that the first figure is moved in the first image is displayed on the second image by the information processing device in correlation with the second figure. For this reason, it is possible to cause a user to grasp, through the second image displayed by the display device, that the first figure of the first image projected by the projection device is moved.

Appendix 2

The display method described in the appendix 1, wherein a position of the second figure at a time when the position of the first figure is a first position is same as a position of the second figure at a time when the position of the first figure is a second position different from the first position.

Accordingly, even if the position of the first figure in the first image is changed from the first position to the second position, the position of the second figure in the second image is not changed. When the movement of the first figure in the first image is associated with the movement of the second figure in the second image, depending on a projection target onto which the projection device projects the first image, a shift sometimes occurs between the movement of the first figure in the first image and the movement of the second figure in the second image to give discomfort to the user. For this reason, even if the position of the first figure in the first image is changed, discomfort is not given to the user by not changing the position of the second figure in the second image.

Appendix 3

The display method described in the appendix 1 or 2, wherein the movement indicator includes at least one of a direction indicator indicating a moving direction of the first figure and a movement amount indicator indicating a movement amount of the first figure.

Accordingly, the movement of the first figure is displayed by the direction indicator indicating the moving direction of the first figure and the movement amount indicator indicating the movement amount of the first figure. For this reason, even when the user has difficulty in visually recognizing the first figure of the first image projected by the projection device, it is possible to cause the user to grasp that the first figure is moved according to the moving operation.

Appendix 4

The display method described in the appendix 2 or 3, wherein the moving operation includes an operation of designating a position of the first figure after the movement in the second image, the displaying the second image with the information processing device includes displaying a third figure at a position of the second image designated by the designating operation, the moving the position of the first figure in the first image with the projection device includes moving, with the projection device, the first figure to a position of the first image corresponding to the position of the third figure in the second image, and the displaying the second image with the information processing device further includes erasing the third figure from the second image with the information processing device after the movement of the first figure ends.

Accordingly, by performing the operation of designating the position of the first figure after the movement in the second image, the third figure is displayed at the designated position of the second image. It is possible to move the first figure to the position of the first image corresponding to the position of the third figure in the second image. Therefore, the position of the first figure in the first image can be changed with intuitive operation. After the movement of the first figure ends, the third figure is deleted from the second image. Therefore, it is possible to erase a figure unnecessary for operation.

Appendix 5

The display method described in the appendix 4, wherein the third figure is congruous with or similar to the second figure.

Accordingly, the design of the third figure becomes the same as the design of the second figure and the second figure not moving in the second image is seen as if the second figure is virtually moving. It is possible to improve operability.

Appendix 6

The display method described in the appendix 4 or 5, wherein the movement indicator is a plurality of arrow images corresponding to a plurality of moving directions of the first figure in a one-to-one relation, and the displaying the second image with the information processing device further includes displaying, with the information processing device, the moving direction of the third figure by combining at least one of the plurality of arrow images and the third figure.

Accordingly, the moving direction of the third figure is displayed as a combination of at least one of the plurality of arrow images and the third figure. For this reason, it is possible to cause the user to grasp the moving direction of the third figure.

Appendix 7

The display method described in any one of the appendices 4 to 6, wherein the displaying the second image with the information processing device includes displaying, with the information processing device, a range image indicating a movable range of the third figure.

Accordingly, the range image indicating the range in which the third figure is movable is displayed as the second image. For this reason, it is possible to cause the user to grasp the range in which the third figure can be moved.

Appendix 8

The display method described in the appendix 7, further including displaying, with the information processing device, a third image including the second figure, the third figure, and the range image to be superimposed on the second image, wherein display sizes of the second figure, the third figure, and the range image in the third image are larger than display sizes of the second figure, the third figure, and the range image in the second image.

Accordingly, the third image including the second figure, the third figure, and the range image is displayed to be superimposed on the second image. Since the display sizes of the second figure, the third figure, and the range image in the third image are larger than the display sizes of the second figure, the third figure, and the range image in the second image, it is possible to improve the operability of the user.

Appendix 9

The display method described in any one of the appendices 4 to 8, wherein the displaying the second image includes: displaying the third figure with the information processing device when receiving operation with the first operation device; and displaying a direction indicator indicating a moving direction of the first figure with the information processing device when receiving operation with a second operation device different from the first operation device.

Accordingly, the display of the second image is different when the operation is performed by the first operation device and when the operation is performed by the second operation device. For this reason, it is possible to cause the user to recognize an operation device operated by the user.

Appendix 10

The display method described in the appendix 9, wherein the first operation device receives operation in a first mode from a user, and the second operation device receives operation in a second mode different from the operation in the first mode from the user.

Accordingly, the first operation device receives the operation in the first mode from the user and the second operation device receives the operation in the second mode different from the operation in the first mode from the user. For this reason, by changing the operation device, it is possible to operate the second figure displayed in the second image in different operation modes.

Appendix 11

The display method described in the appendix 9 or 10, wherein the first operation device is a mouse, the second operation device is a plurality of cursor keys provided in a keyboard, the third figure is moved by drag operation on the mouse, and the direction indicator corresponds to a direction indicated by the cursor key.

Accordingly, it is possible to move the third figure by dragging the mouse and it is possible to display the direction indicator in a direction corresponding to operation received by the cursor key of the keyboard.

Appendix 12

The display method described in any one of the appendices 3 to 11, wherein the second image includes a first region where the moving operation is received and the direction indicator and the second figure are displayed and a second region where the movement amount indicator is displayed.

Accordingly, the second image including the first region where the moving operation is received and the direction indicator and the second figure are displayed and the second region where the movement amount indicator is displayed is displayed. It is possible to cause the user to recognize the moving direction and the movement amount of the second figure.

Appendix 13

The display method described in any one of appendices 1 to 8, wherein the displaying the second image includes displaying, with the information processing device, instead of the second figure, a fourth figure, at least one of a shape and a color of which is different from a shape or a color of the second figure, while the position of the first figure in the first image is moved.

Accordingly, while the position of the first figure is moved, the fourth figure, at least one of the shape and the color of which is different from the shape or the color of the second figure is displayed instead of the second figure. Accordingly, it is possible to cause the user to grasp that the position of the first figure is moved.

Appendix 14

An information processing device including one or a plurality of processors that control a display device, wherein the one or the plurality of processors execute: displaying, on the display device, a second image including a second figure corresponding to a first figure included in a first image projected from a projection device; when moving operation of moving a position of the first figure is received, displaying, on the second image, in correlation with the second figure corresponding to the first figure selected by the moving operation, a movement indicator indicating that the first figure is moved in the first image; and transmitting a projection instruction for the first figure after the movement to the projection device.

Accordingly, when the moving operation of moving the position of the first figure is received, the movement indicator indicating that the first figure is moved in the first image is displayed on the second image by the information processing device in correlation with the second figure. For this reason, it is possible to cause a user to grasp, through the second image displayed by the display device, that the first figure of the first image projected by the projection device is moved.

Appendix 15

A non-transitory computer-readable storage medium storing a program for causing a processor mounted on an information processing device, which controls a display device, to execute: causing the display device to display a second image including a second figure corresponding to a first figure included in a first image projected from a projection device; when moving operation of moving a position of the first figure is received, displaying, on the second image, in correlation with the second figure, a movement indicator indicating that the first figure is moved in the first t image; and transmitting a projection instruction for the first figure after the movement to the projection device.

Accordingly, when the moving operation of moving the position of the first figure is received, the movement indicator indicating that the first figure is moved in the first image is displayed on the second image by the information processing device in correlation with the second figure. For this reason, it is possible to cause a user to grasp, through the second image displayed by the display device, that the first figure of the first image projected by the projection device is moved.

What is claimed is:

1. A display method in a projection system including a projection device and an information processing device, the method comprising:

projecting a first image including a first figure from the projection device;

displaying, with the information processing device, a second image including a second figure corresponding to the first figure on a display device different from the projection device;

when moving operation of moving a position of the first figure is received by the information processing device, causing the information processing device to display, on the second image, in correlation with the second figure, a movement indicator indicating that the first figure is moved in the first image; and projecting the first figure after the movement from the projection device, wherein:

a position of the second figure at a time when the position of the first figure is a first position is same as a position of the second figure at a time when the position of the first figure is a second position different from the first position.

2. The display method according to claim 1, wherein the movement indicator includes at least one of a direction indicator indicating a moving direction of the first figure and a movement amount indicator indicating a movement amount of the first figure.

3. The display method according to claim 2, wherein the second image includes a first region where the moving operation is received and the direction indicator and the second figure are displayed and a second region where the movement amount indicator is displayed.

4. The display method according to claim 1, wherein the moving operation includes an operation of designating a position of the first figure after the movement in the second image, the displaying the second image with the information processing device includes displaying a third figure at a position of the second image designated by the designating operation, the moving the position of the first figure in the first image with the projection device includes moving, with the projection device, the first figure to a position of the first image corresponding to the position of the third figure in the second image, and the displaying the second image with the information processing device further includes erasing the third figure from the second image with the information processing device after the movement of the first figure ends.

5. The display method according to claim 4, wherein the third figure is congruous with or similar to the second figure.

6. The display method according to claim 4, wherein the movement indicator is a plurality of arrow images corresponding to a plurality of moving directions of the first figure in a one-to-one relation, and the displaying the second image with the information processing device further includes displaying, with the information processing device, the moving direction of the third figure by combining at least one of the plurality of arrow images and the third figure.

7. The display method according to claim 4, wherein the displaying the second image with the information processing device includes displaying, with the information processing device, a range image indicating a movable range of the third figure.

8. The display method according to claim 7, further comprising displaying, with the information processing device, a third image including the second figure, the third figure, and the range image to be superimposed on the second image, wherein display sizes of the second figure, the third figure, and the range image in the third image are larger than display sizes of the second figure, the third figure, and the range image in the second image.

9. The display method according to claim 4, wherein the displaying the second image includes:

displaying the third figure with the information processing device when receiving operation with the first operation device; and displaying a direction indicator indicating a moving direction of the first figure with the information processing device when receiving operation with a second operation device different from the first operation device.

10. The display method according to claim 9, wherein the first operation device receives operation in a first mode from a user, and the second operation device receives operation in a second mode different from the operation in the first mode from the user.

11. The display method according to claim 9, wherein the first operation device is a mouse, the second operation device is a plurality of cursor keys provided in a keyboard, the third figure is moved by drag operation on the mouse, and the direction indicator corresponds to a direction indicated by the cursor key.

12. The display method according to claim 1, wherein the displaying the second image includes displaying, with the information processing device, instead of the second figure, a fourth figure, at least one of a shape and a color of which is different from a shape or a color of the second figure, while the position of the first figure in the first image is moved.

13. An information processing device including one or a plurality of processors that control a display device, wherein the one or the plurality of processors execute:

displaying, on the display device, a second image including a second figure corresponding to a first figure included in a first image projected from a projection device;

when moving operation of moving a position of the first figure is received, displaying, on the second image, in correlation with the second figure corresponding to the first figure selected by the moving operation, a movement indicator indicating that the first figure is moved in the first image; and transmitting a projection instruction for the first figure after the movement to the projection device, wherein:

a position of the second figure at a time when the position of the first figure is a first position is same as a position of the second figure at a time when the position of the first figure is a second position different from the first position.

14. A non-transitory computer-readable storage medium storing a program for causing a processor mounted on an information processing device, which controls a display device, to execute:

causing the display device to display a second image including a second figure corresponding to a first figure included in a first image projected from a projection device;

when moving operation of moving a position of the first figure is received, displaying, on the second image, in correlation with the second figure, a movement indicator indicating that the first figure is moved in the first image; and transmitting a projection instruction for the first figure after the movement to the projection device, wherein:

a position of the second figure at a time when the position of the first figure is a first position is same as a position of the second figure at a time when the position of the first figure is a second position different from the first position.

* * * * *